US012036788B2

(12) United States Patent
Sanada

(10) Patent No.: US 12,036,788 B2
(45) Date of Patent: Jul. 16, 2024

(54) THERMAL PRINTER WITH REDUCED PRINT MEDIUM CONVEYANCE LOAD

(71) Applicant: TOSHIBA TEC KABUSHIKI KAISHA, Tokyo (JP)

(72) Inventor: Tsuyoshi Sanada, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 17/583,425

(22) Filed: Jan. 25, 2022

(65) Prior Publication Data

US 2022/0297451 A1 Sep. 22, 2022

(30) Foreign Application Priority Data

Mar. 18, 2021 (JP) ................................ 2021-044750

(51) Int. Cl.
*B41J 11/057* (2006.01)
*B41J 2/325* (2006.01)
*B41J 2/335* (2006.01)
*B41J 11/14* (2006.01)

(52) U.S. Cl.
CPC ............ *B41J 11/057* (2013.01); *B41J 2/325* (2013.01); *B41J 2/33505* (2013.01); *B41J 11/14* (2013.01)

(58) Field of Classification Search
CPC ...... B41J 11/057; B41J 2/33505; B41J 11/14; B41J 2/325
See application file for complete search history.

(56) References Cited

FOREIGN PATENT DOCUMENTS

JP 09-267413 10/1997
WO WO-0194121 A2 * 12/2001 ............ B41J 11/057

* cited by examiner

*Primary Examiner* — Henok D Legesse
(74) *Attorney, Agent, or Firm* — Amin, Turocy & Watson, LLP

(57) ABSTRACT

A thermal printer according to an embodiment includes: a platen that has a rotatable columnar shape and that is configured to convey a print medium having various widths, with a central portion in a direction of a rotary shaft as a reference, in a manner of being in contact with an outer peripheral portion; and a print head that is oppositely disposed along the platen, that is pressed by the outer peripheral portion, and that is configured to perform printing by applying heat to the print medium. The platen includes a shaft constituting the rotary shaft and a rubber including the outer peripheral portion provided on an outer periphery of the shaft, and has a first region centered on the central portion and second regions on both outer sides in the direction of a rotary shaft with respect to the first region. A diameter of the platen in the first region and diameters of the platen in the second regions are the same, and a thickness of the rubber in the first region is smaller than thicknesses of the rubber in the second regions.

16 Claims, 6 Drawing Sheets

THERMAL PRINTER WITH REDUCED PRINT MEDIUM CONVEYANCE LOAD

CROSS-REFERENCE TO RELATED APPLICATION

This application is based upon and claims the benefit of priority from Japanese Patent Application No. 2021-044750, filed on Mar. 18, 2021, the entire contents of which are incorporated herein by reference.

FIELD

Embodiments described herein relate generally to a thermal printer, a receipt printer, and a label printer.

BACKGROUND

In a thermal printer that performs printing by conveying a sheet such as a label or a receipt, printing is performed on the sheet by a printing unit including a print head in which heat-generating elements are arranged in substantially one row and a platen.

Such a thermal printer uses sheets of various sizes according to applications, sandwiches the sheet between the print head and the platen, and performs printing on the sheet while conveying the sheet by rotating the platen.

This thermal printer uses a wide print head and a platen so that printing can be performed on a large-size sheet. Therefore, when printing is performed on a sheet having a small width, since printing is performed near a center of the printing unit, no sheet is present at both end portions of the print head, and the rotating platen is in direct contact with the print head.

At this time, frictional resistance generated between the print head and the platen causes a load when the sheet is conveyed, which has a negative effect on sheet conveyance.

DETAILED DESCRIPTION

In general, according to one embodiment, a thermal printer capable of reducing a load of sheet conveyance due to frictional resistance is provided.

The thermal printer according to the embodiment includes: a platen that has a rotatable columnar shape and that is configured to convey a print medium having various widths, with a central portion in a direction of a rotary shaft as a reference, in a manner of being in contact with an outer peripheral portion; and a print head that is oppositely disposed along the platen, that is pressed by the outer peripheral portion, and that is configured to perform printing by applying heat to the print medium. The platen includes a shaft constituting the rotary shaft and a rubber including the outer peripheral portion provided on an outer periphery of the shaft, and has a first region centered on the central portion and second regions on both outer sides in the direction of a rotary shaft with respect to the first region. A diameter of the platen in the first region and diameters of the platen in the second regions are the same, and a thickness of the rubber in the first region is smaller than thicknesses of the rubber in the second regions.

Hereinafter, the thermal printer according to the embodiment will be described in detail. In the embodiment, a label formed of thermal paper is described as an example of a print medium. The disclosure is not limited to the embodiments described below.

Figure 1:
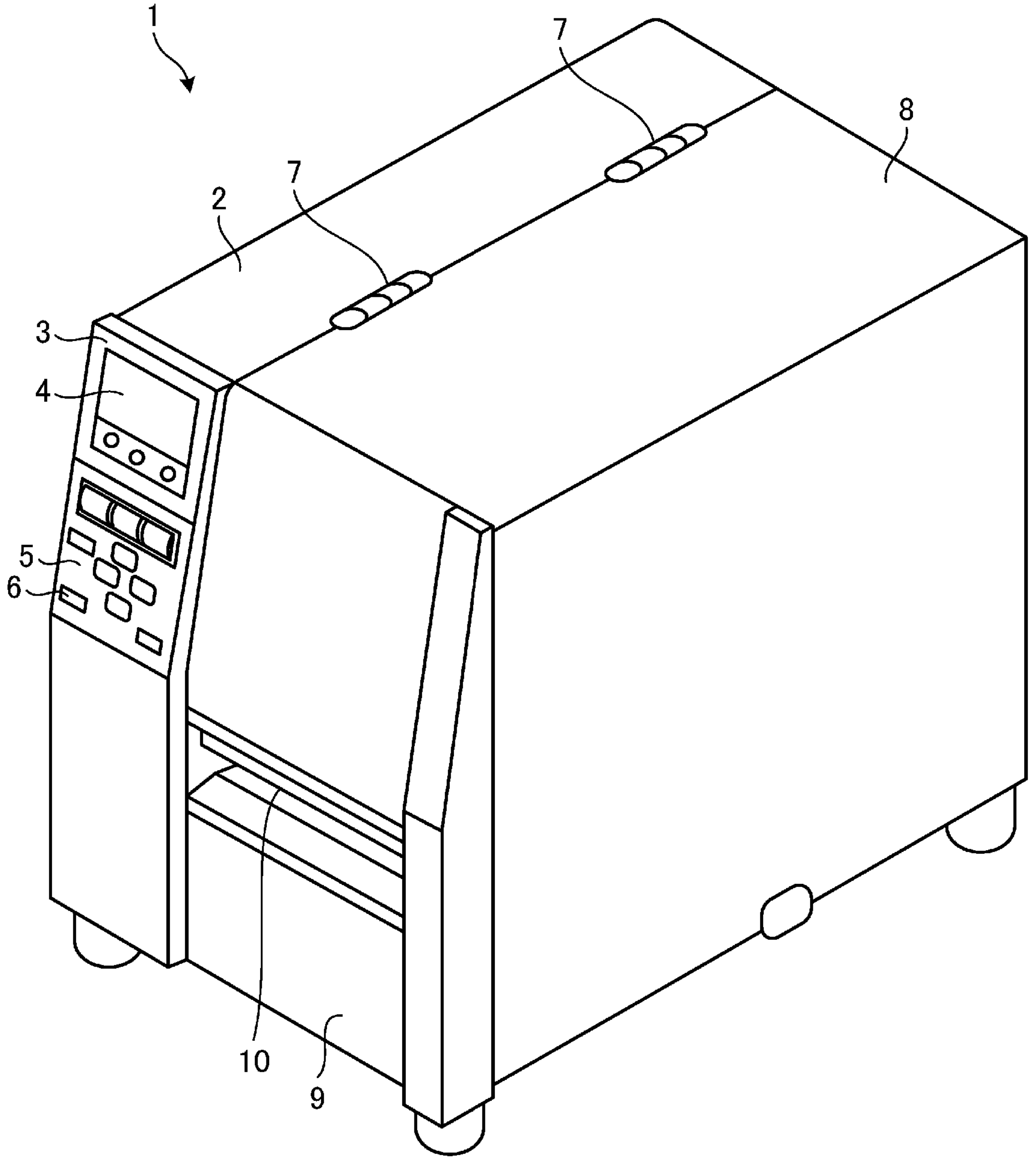
FIG. 1 is an external perspective view of a printer according to an embodiment.

FIG. 1 is an external perspective view of a thermal printer 1 according to an embodiment. As illustrated in FIG. 1, the thermal printer 1 includes a case 2 on a left side and a case 8 connected to a right side of the case 2 by hinges 7. A front panel 3 of the case 2 includes a display unit 4 and an operation unit 5. The display unit 4 is a liquid crystal display having a backlight, and other types of display devices may be used.

The case 8 on the right side has a structure in which an inside of a housing (that is, cases 2 and 8) can be widely opened from a side surface side by rotating the case 8 upward about the hinges 7. As will be described later with reference to FIG. 2, the thermal printer 1 includes, inside the housing, a label sheet 20 wound in a roll and a printing unit 23 that performs printing on a label 201 (print medium). By rotating the case 8 upward about the hinges 7, a structure that can facilitate replacement of the label sheet 20 or internal maintenance is provided. A front panel 9 of the case 8 is formed with a label issuing port 10. The thermal printer 1 issues labels after printing from the label issuing port 10.

Figure 2:
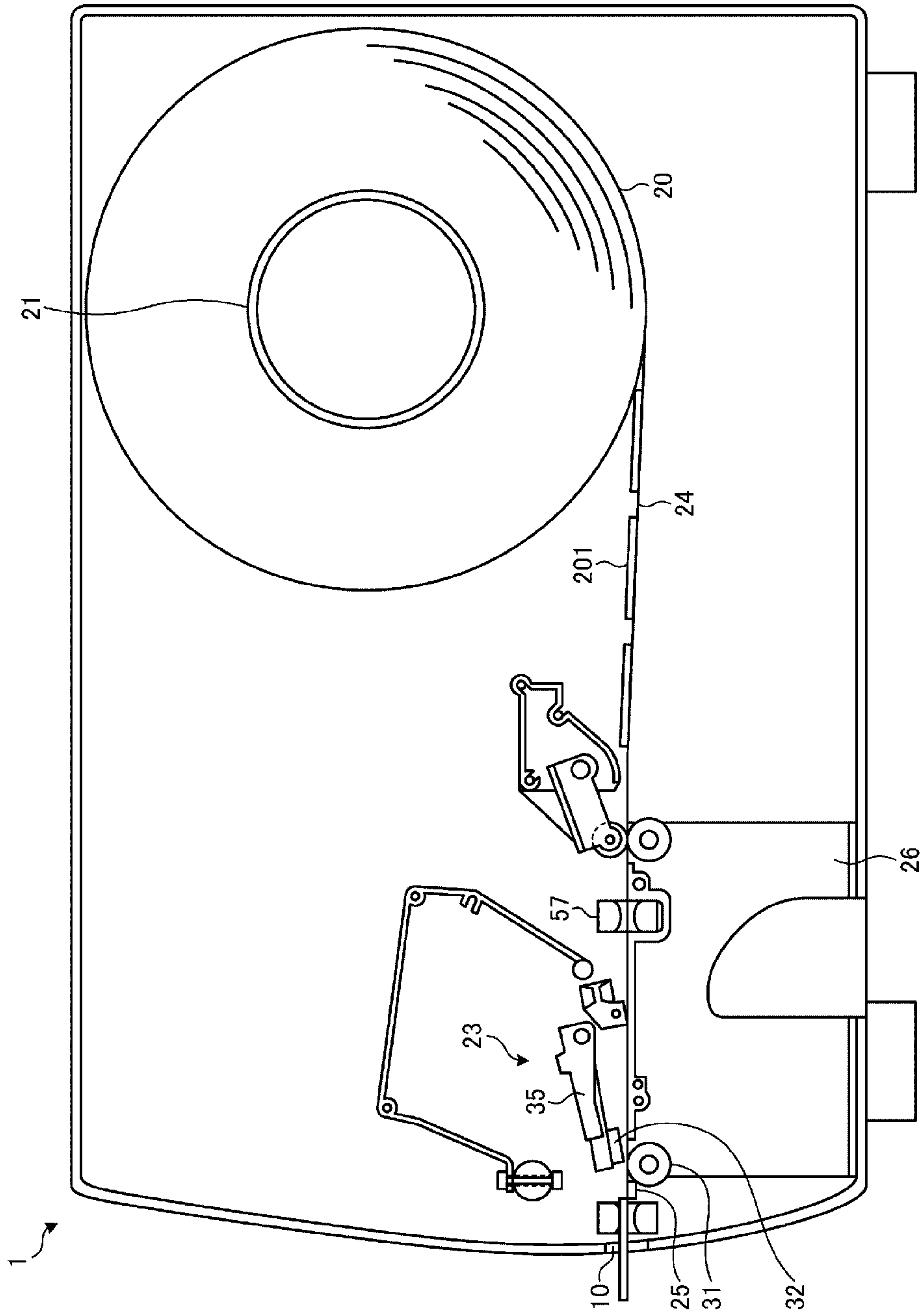
FIG. 2 is a schematic side cross-sectional view illustrating an internal configuration.

FIG. 2 is a schematic side cross-sectional view illustrating an internal configuration of the thermal printer 1. As illustrated in FIG. 2, the thermal printer 1 mainly includes, inside the housing thereof, a sheet holding unit 21, a printing unit 23, and a frame 26.

The sheet holding unit 21 is a shaft that holds the label sheet 20 wound in a roll together with a liner. The label sheet 20 has a plurality of labels 201 arranged along a conveyance direction. The label sheet 20 is pulled out from the sheet holding unit 21, and discharged from the label issuing port 10 after the printing unit 23 performs printing on the label 201.

A conveyance path 24 is a path through which the label sheet 20 pulled out from the sheet holding unit 21 is conveyed to positions of a print head 32 and a platen 31 described below. The conveyance path 24 also includes a sheet detection unit 57 that detects the pulled-out label 201. The sheet detection unit 57 is located in the conveyance path 24 between a position where the label 201 is pulled out, and the print head 32 and the platen 31 described below.

A label peeling plate 25 is provided downstream of the printing unit 23 in a conveyance direction in the conveyance path 24. The label peeling plate 25 bends the liner of the label sheet 20 during conveyance at an acute angle and peels off the label 201 and the liner. The liner is wound around a winding shaft (not illustrated), and the label 201 peeled off from the liner is issued from the label issuing port 10.

The printing unit 23 mainly includes the print head 32 including thermal heads in which heat-generating elements are disposed in a row in a direction (that is, a width direction of the label 201) substantially orthogonal to the conveyance direction of the label 201. The platen 31 having a columnar shape is rotatably attached to the frame 26, and is rotated by being driven by a platen motor (not illustrated).

The print head 32 is fixed to a head holding unit 35 rotatably attached to a frame (not illustrated). The print head 32 is biased in a direction of pressing against the platen 31 in accordance with a rotation operation of the head holding unit 35, and abuts against and separates from the platen 31. The thermal printer 1 includes a head-up mechanism that moves the print head 32 up and a head abut mechanism that brings the print head 32 to abut against the platen 31 (both mechanisms are not illustrated). When the head-up mechanism is operated, the print head 32 is separated from the platen 31, and when the head abut mechanism is operated, the print head 32 is biased (pressed) in the direction of the platen 31 and abuts against the platen 31.

Figure 3:
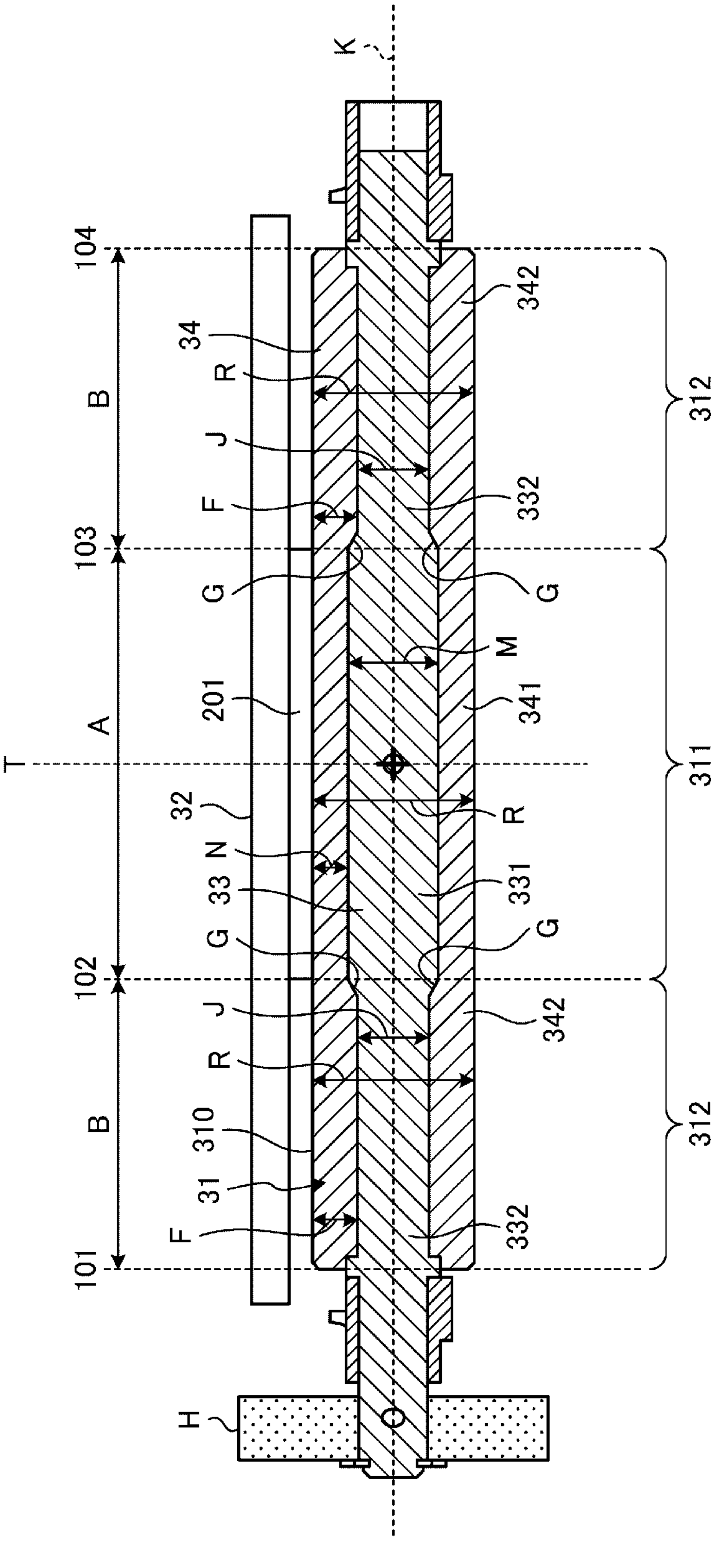
FIG. 3 is an explanatory view illustrating an example of a structure of a platen.

Hereinafter, the platen 31 will be described. FIG. 3 is an explanatory view illustrating an example of a structure of the platen 31. As illustrated in FIG. 3, the platen 31 and the print head 32 face each other. The print head 32 prints characters, figures, and the like on the label 201 by selectively heating the heat-generating elements (not illustrated) arranged in a row along the print head 32 (that is, in a direction of a rotary shaft K of the platen 31). The label 201 (to be exact, the label 201 and the liner (not illustrated) to which the label 201 is attached) is sandwiched between the platen 31 and the print head 32.

The platen 31 has a first region 311 and second regions 312, as will be described later. The first region 311 is located in the central portion of the platen 31 with the central portion T as the center, and has a length A (mm) between a dotted line 102 and a dotted line 103. The second regions 312 are connected to both end portions of the first region 311, and have a length B (mm) between a dotted line 101 and the dotted line 102 and the length B between the dotted line 103 and a dotted line 104.

The platen 31 includes a shaft 33 that is rotatable around the rotary shaft K, a rubber 34 formed on an outer periphery of the shaft 33, a gear H, and the like. The shaft 33 is made of a metal such as aluminum. The shaft 33 has a first region 331 including the central portion T and second regions 332 on both outer sides of the first region 331 in a direction of the rotary shaft K. The first region 331 of the shaft 33 has the length A (mm) between the dotted line 102 and the dotted line 103 on both sides with the central portion T of the shaft 33 in the direction of the rotary shaft K as the center. The length A substantially coincides with the width of the minimum label 201 on which the thermal printer 1 can perform printing. The second regions 332 of the shaft 33 are connected to both end portions of the first region 331, and have the length B (mm) between the dotted line 101 and the dotted line 102 and the length B between the dotted line 103 and the dotted line 104. A length of the platen 31 in the direction of the rotary shaft K is A+2×B.

The length of the diameter of the shaft 33 in the first region 331 is M (millimeters (mm)), and the length of the diameter of the shaft 33 in the second regions 332 is a diameter J (mm) smaller than M. In the shaft 33, at boundaries (positions of the dotted line 102 and the dotted line 103) between the first region 331 and the second region 332, four stepped portions G are formed with inclinations of approximately 45°. Therefore, one manufacturing process can be omitted when the shaft 33 is molded.

The rubber 34 is formed by pouring, for example, molten silicon rubber into a mold in a state in which the shaft 33 is located at the central portion having a columnar shape and solidifying the silicon rubber. The rubber 34 is polished to have an accurate diameter after formation, and is formed in a columnar shape including an outer peripheral portion 310. The rubber 34 has a first region 341 and second regions 342. The first region 341 and the first region 331 are regions having the same length A (mm) between the dotted line 102 and the dotted line 103. The second regions 342 are the same as the second regions 332, and have the length B (mm) between the dotted line 101 and the dotted line 102 and the length B between the dotted line 103 and the dotted line 104. The thickness of the rubber 34 in the first region 341 is N (mm), and the thickness of the rubber 34 in the second regions 342 is a thickness F (mm) larger than the thickness N. That is, the thickness of the rubber 34 in the first region 341 is smaller than the thickness of the rubber 34 in the second regions 342.

The first region 331 of the shaft 33 and the first region 341 of the rubber 34 are the first region 311 of the platen 31. The second regions 332 of the shaft 33 and the second regions 342 of the rubber 34 are the second regions 312 of the platen 31. The diameters of the first region 311 and the second regions 312 of platen 31 are all R (mm). Therefore, in the first region 311, M+N=R. In the second region 312, J+F=R.

Since one type of rubber 34 is used for the platen 31 according to the embodiment, the hardness of the rubber 34 is the same everywhere. However, if the rubber 34 is thin, the apparent hardness when the outer peripheral portion 310 is pressed is high, and if the rubber 34 is thick, the apparent hardness when the outer peripheral portion 310 is pressed is low. That is, in the rubber 34 of the platen 31, the thickness of the first region 341 is N while the thickness of the second regions 342 is F. Further, since N<F, the apparent hardness in the first region 341 is higher than the apparent hardness in the second regions 342. Therefore, when the outer peripheral portion 310 is pressed, the deformation amount of the rubber 34 in the first region 341 is smaller than the deformation amounts of the rubber 34 in the second regions 342.

The gear H is fixed to the shaft 33. The platen 31 is rotatably attached such that the shaft 33 is fitted into the frame 26. Rotational power is transmitted from the platen motor to the gear H, so that the shaft 33 of the platen 31 rotates about the rotary shaft K. Rotation of the shaft 33 causes the platen 31 to rotate. When the platen 31 rotates, the label 201 sandwiched between the platen 31 and the print head 32 is conveyed by the frictional force between the rubber 34 and the label 201.

The platen 31 includes the outer peripheral portion 310 on a peripheral surface. The outer peripheral portion 310 abuts against the sandwiched label 201 (to be exact, the liner). The platen 31 conveys the label 201 with the central portion T (a position denoted by a dotted line T) as a reference position. That is, the platen 31 conveys the label 201 to be conveyed such that the central portion of the width of the label 201 is located at the central portion T regardless of whether the length (the width of the label 201, to be exact, the width of the liner, hereinafter referred to as the "width of the label") of the label 201 is long or short in a direction orthogonal to the conveyance direction of the label 201. That is, the platen 31 conveys the label 201 with reference to the central portion.

In this embodiment, when the platen 31 is rotated and the label 201 having the shortest label width is sandwiched and conveyed between the platen 31 and the print head 32, the label 201 is interposed and conveyed between the dotted line 102 and the dotted line 103 (the first region 311). However, the label 201 is not present between the dotted line 101 and the dotted line 102 (the second region 312) and between the dotted line 103 and the dotted line 104 (the second region 312). Since the print head 32 is biased in the direction of the platen 31, the print head 32 and the platen 31 are in direct contact with each other at a position between the dotted line 101 and the dotted line 102 and a position between the dotted line 103 and the dotted line 104 except for positions near both end portions of the label 201. However, since the thickness N of the rubber 34 in the first region 311 is small, the apparent hardness of the outer peripheral portion 310 in the first region 341 of the rubber 34 is high. Therefore, even if a pressing force is applied by the print head 32, the rubber 34 sandwiches the label 201 in the first region 341 without being crushed so much (that is, the rubber 34 in the first region 341 is not deformed so much).

If the rubber 34 in the first region 341 is not crushed so much, the distance between the platen 31 and the print head 32 can be maintained with the label 201 in between. Therefore, in the second regions 312 of the platen 31, the print head 32 is in contact with the second regions 342 of the rubber 34, but the pressing force received from the print head 32 is not large. Therefore, the deformation amounts of the second regions 342 of the rubber 34 due to the pressing force of the print head 32 are small, and thus the contact areas between the print head 32 and the second regions 342 are small. Therefore, the frictional resistance between the print head 32 and the second regions 342 can be controlled to be small.

In order to prevent the platen 31 from bending due to the pressing of the print head 32, the diameter of the shaft 33 needs to have a certain value. Therefore, the shaft 33 is preferably formed such that the diameters of the second regions 332 of the shaft 33 are set as reference diameters and the diameter of the first region 331 is larger than the reference diameters. However, for example, for the platen 31 having a large size, the diameter of the first region 331 may be set as a reference diameter, and the diameters of the second regions 332 may be smaller than the reference diameter.

Figure 4:
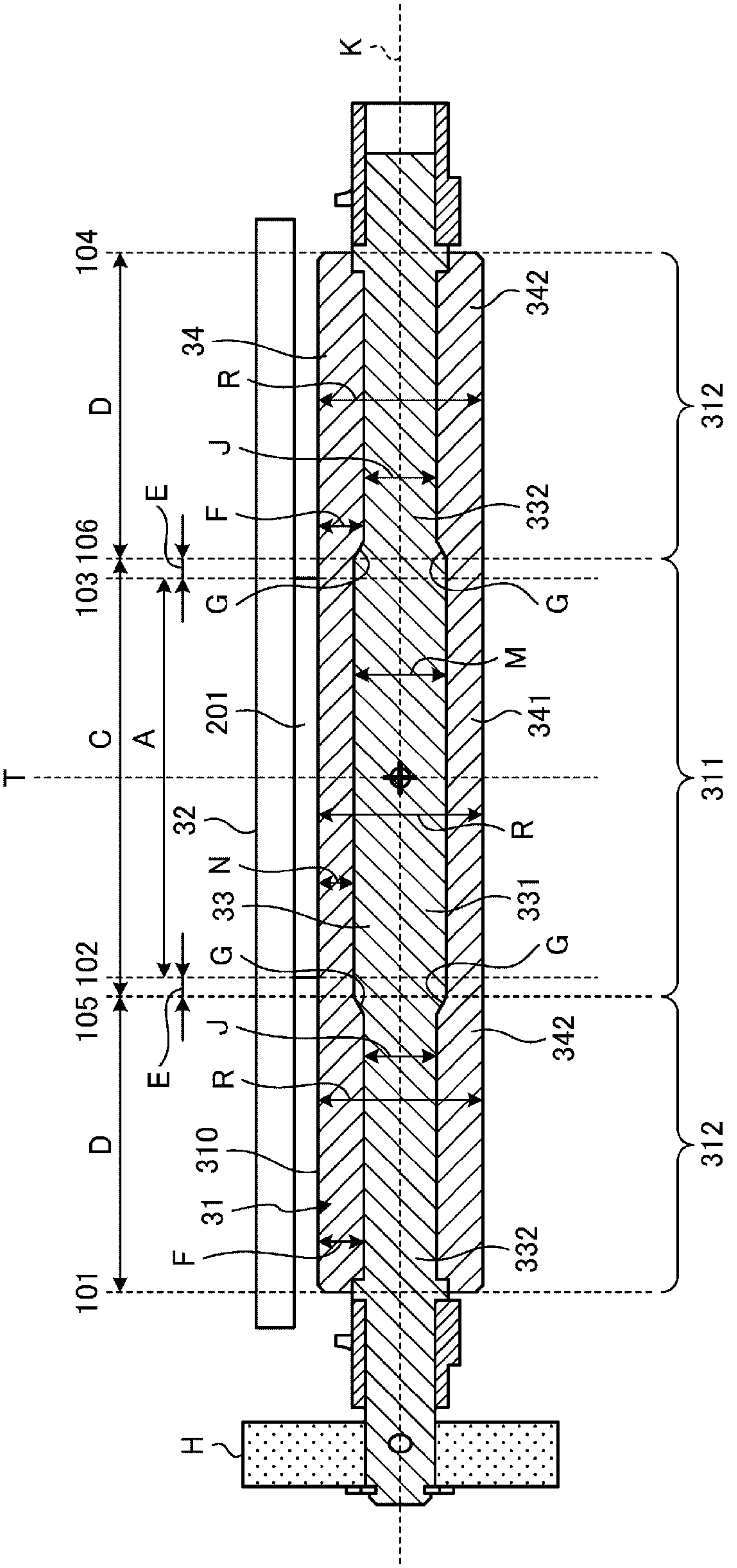
FIG. 4 is an explanatory view illustrating a first modification.

Hereinafter, a first modification of the embodiment will be described. FIG. 4 is an explanatory view illustrating a first modification of a structure of the platen 31. In regions of both end portions of the label 201, the print head 32 is difficult to be in direct contact with the platen 31 due to an influence of the sheet thickness of the label 201. Therefore, in the first modification, the first region 311 (that is, the first region 331 and the first region 341) is slightly expanded to both end sides of the platen 31 with respect to the embodiment. Specifically, in the first modification, the first region 311 is expanded to both end sides by E (mm) to obtain a length C (C=A+2×E (A is the width of the label 201)). That is, the first region 341 of the rubber 34 is 2×E longer than that according to the embodiment. Therefore, the region where the thickness of the first region 341 of the rubber 34 is N is wider than that according to the embodiment. Therefore, the apparent hardness of the rubber 34 in the first region 341 is higher than that according to the embodiment, and the deformation amount of the rubber 34 in the first region 341 is smaller than that according to the embodiment. Then, in the second regions 312 of the platen 31, the print head 32 is in contact with the second regions 342 of the rubber 34, the pressing force received from the print head 32 is not higher than that according to the embodiment. Therefore, the deformation amounts of the second regions 342 of the rubber 34 due to the pressing force of the print head 32 are small, and thus the contact areas between the print head 32 and the second regions 342 are small. Therefore, the frictional resistance between the print head 32 and the second regions 342 can be controlled to be small.

Figure 5:
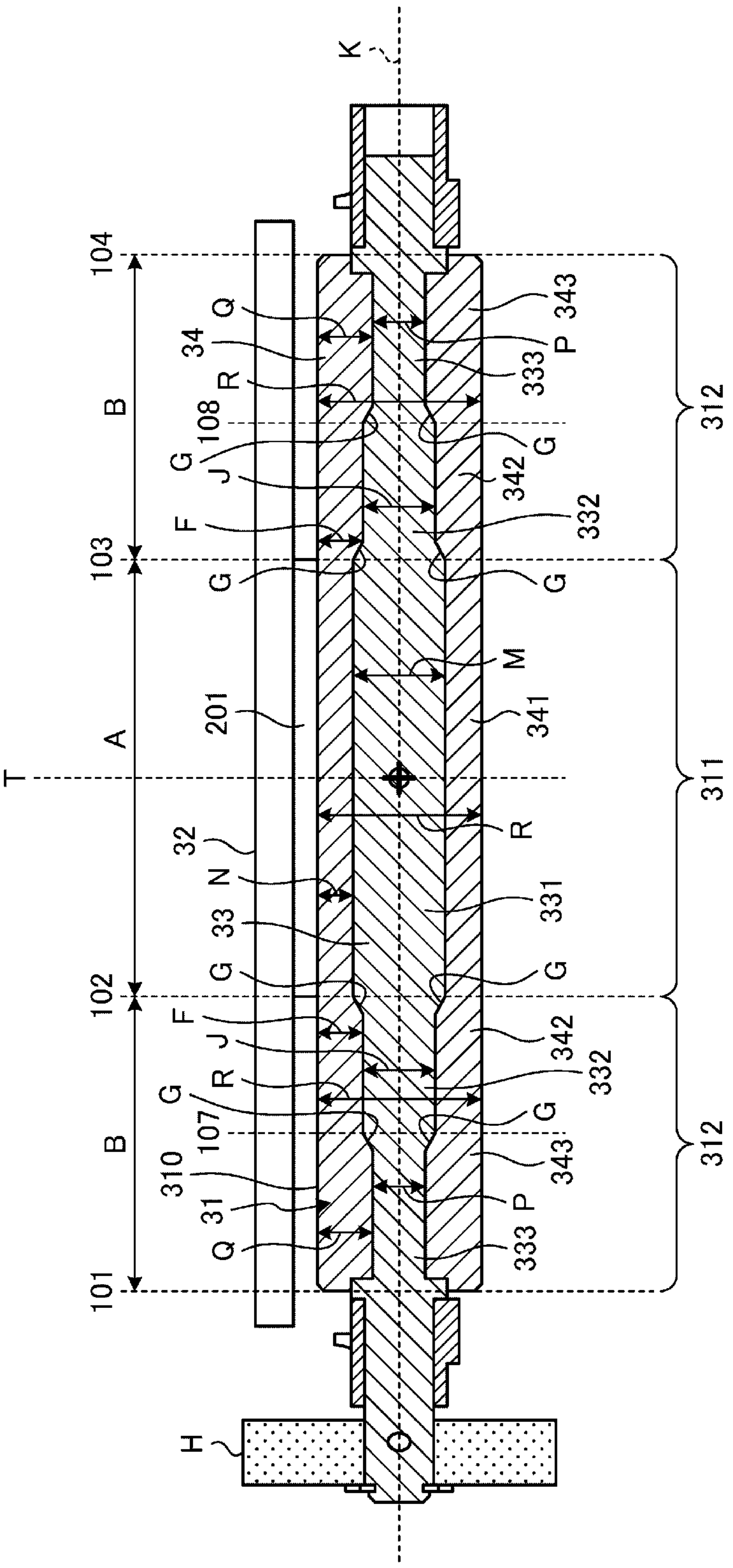
FIG. 5 is an explanatory view illustrating a second modification.

Hereinafter, a second modification of the embodiment will be described. FIG. 5 is an explanatory view illustrating a second modification of the structure of the platen 31. In the embodiment and the first modification, in the second regions 312 of the platen 31, the diameters of the second regions 332 of the shaft 33 are both the diameter J, and the thicknesses of the second regions 342 of the rubber 34 are both the thickness F. That is, in the embodiment and the first modification, in the second regions 312, the thicknesses of the second regions 332 of the shaft 33 and the thicknesses of the second regions 342 of the rubber 34 are the same. As illustrated in FIG. 5, in the second modification, in the second regions 312 of the platen 31, the thicknesses of the second regions 332 of the shaft 33 and the thicknesses of the second regions 342 of the rubber 34 are different in a stepwise manner.

That is, in the second modification, between the dotted line 102 and a dotted line 107 in the second region 312, the diameter of the second region 332 of the shaft 33 is the diameter J, and the thickness of the second region 342 of the rubber 34 is the thickness F. Similarly, between the dotted line 103 and a dotted line 108 in the second region 312, the diameter of the second region 332 of the shaft 33 is the diameter J, and the thickness of the second region 342 of the rubber 34 is the thickness F. However, between the dotted line 107 and the dotted line 101 in the second region 312, the diameter of the second region 332 of the shaft 33 is a diameter P (<the diameter J), and the thickness of the second region 342 of the rubber 34 is a thickness Q (>the thickness F). Similarly, between the dotted line 108 and the dotted line 104 in the second region 312, the diameter of the second region 332 of the shaft 33 is the diameter P (<the diameter J), and the thickness of the second region 342 of the rubber 34 is the thickness Q (>the thickness F).

Also in the second modification, if the rubber 34 in the first region 341 is not crushed so much, the distance between the platen 31 and the print head 32 can be maintained with the label 201 in between. Therefore, in the second regions 312 of the platen 31, the print head 32 is in contact with the second regions 342 of the rubber 34, but the pressing force received from the print head 32 is not large. Therefore, the deformation amounts of the second regions 342 of the rubber 34 due to the pressing force of the print head 32 are small, and thus the contact areas between the print head 32 and the second regions 342 are small. Therefore, the frictional resistance between the print head 32 and the second regions 342 can be controlled to be small. Furthermore, in the second modification, since the thicknesses of the rubber 34 is different in a stepwise manner as compared with the embodiment, the label 201 can be conveyed more stably.

Figure 6:
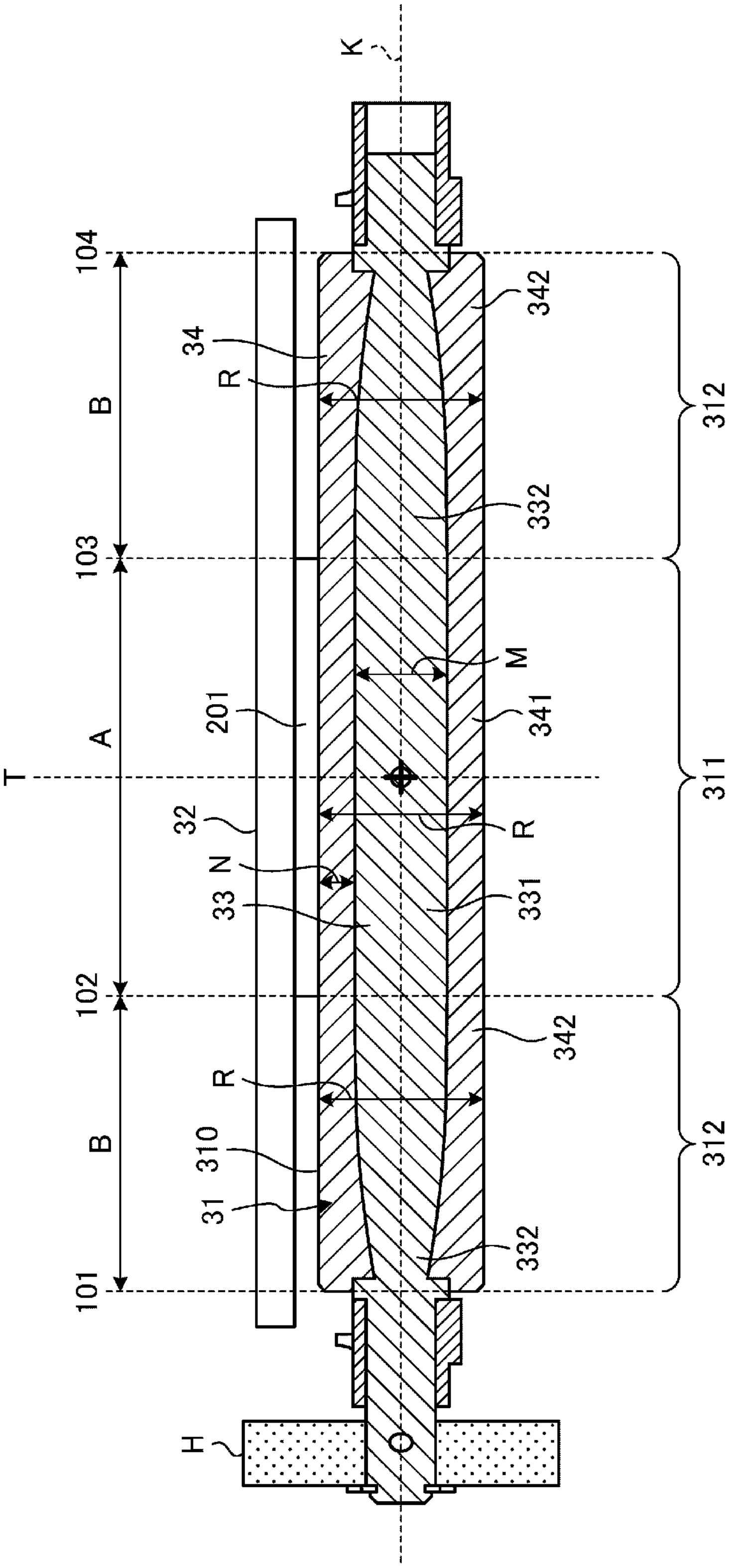
FIG. 6 is an explanatory view illustrating a third modification.

Hereinafter, a third modification of the embodiment will be described. FIG. 6 is an explanatory view illustrating a third modification of the structure of the platen 31. As illustrated in FIG. 6, in the third modification, in the second regions 312 of the platen 31, the thicknesses of the second regions 332 of the shaft 33 and the thicknesses of the second regions 342 of the rubber 34 are continuously different. That is, in the third modification, in the first region 311, the diameter of the first region 331 of the shaft 33 is a diameter M, whereas in the second regions 312, the diameters of the second regions 332 gradually decreases from the diameter M toward both ends. In the first region 311, the thickness of the first region 341 of the rubber is N, whereas in the second regions 312, the thicknesses of the second regions 342 gradually increases from N toward both ends.

Also in the third modification, if the rubber 34 in the first region 341 is not crushed so much, the distance between the platen 31 and the print head 32 can be maintained with the label 201 in between. Therefore, in the second regions 312 of the platen 31, the print head 32 is in contact with the second regions 342 of the rubber 34, but the pressing force received from the print head 32 is not large. Therefore, the deformation amounts of the second regions 342 of the rubber 34 due to the pressing force of the print head 32 are small, and thus the contact areas between the print head 32 and the second regions 342 are small. Therefore, the frictional resistance between the print head 32 and the second regions 342 can be controlled to be small. Further, in the third modification, since the thickness of the rubber 34 is different continuously as compared with the embodiment, the label 201 can be conveyed more stably.

As described above, the thermal printer 1 according to the embodiment includes: the platen 31 that has a rotatable columnar shape and that conveys the label 201 having various widths, with the central portion T in the direction of the rotary shaft K as a reference, in a manner of being in contact with the outer peripheral portion 310; and the print head 32 that is oppositely disposed along the platen 31, that is pressed by the outer peripheral portion 310, and that performs printing by applying heat to the label 201, in which the platen 31 includes the shaft 33 constituting the rotary shaft K and a rubber including the outer peripheral portion 310 provided on the outer periphery of the shaft 33, and has the first region 311 centered on the central portion T and the second regions 312 on both outer sides in the direction of the rotary shaft K with respect to the first region 311, the diameter of the platen 31 in the first region 311 and diameters of the platen 31 in the second regions 312 are the same, and the thickness of the rubber 34 in the first region 311 is smaller than thicknesses of the rubber 34 in the second regions 312.

In the thermal printer 1 according to the embodiment having such a configuration, the contact area between the print head 32 and the platen 31 in the second region 312 can be reduced. Therefore, a load of sheet conveyance due to frictional resistance between the print head 32 and the platen 31 can be reduced.

While the embodiment and modifications have been described above, the embodiment and modifications have been presented by way of example only, and are not intended to limit the scope of the disclosure. These novel embodiments can be implemented in various other forms, and various omissions, substitutions, and modifications may be made without departing from the scope of the disclosure. The embodiment and modifications are included in the scope and the gist of the disclosure and included in the disclosure described in claims and the scope of equivalents of the disclosure.

For example, as described in the embodiment, the label 201 is used as the print medium. However, the print medium is not limited thereto, and may be, for example, a linerless label, a receipt sheet, a cut sheet, or the like.

In the embodiment, inclinations are provided in the stepped portions G between the first region 331 and the second regions 332 of the shaft 33, but these inclinations are not essential configurations.

What is claimed is:

1. A thermal printer, comprising:

a platen having a rotatable columnar shape and configured to convey a print medium having various widths, with a central portion in a direction of a rotary shaft as a reference, in a manner of being in contact with an outer peripheral portion; and a print head oppositely disposed along the platen, pressed by the outer peripheral portion of the platen, and that is configured to perform printing by applying heat to the print medium, wherein the platen comprises a shaft constituting the rotary shaft and a rubber including the outer peripheral portion provided on an outer periphery of the shaft, and has a first region centered on the central portion and second regions on both outer sides in the direction of the rotary shaft with respect to the first region, and a diameter of the platen in the first region and diameters of the platen in the second regions are the same, and a thickness of the rubber in the first region is smaller than a thicknesses of the rubber in the second regions, wherein the first region has a length substantially coinciding with the width of the print medium having a shortest width to be conveyed.

2. The thermal printer according to claim 1, wherein the first region is longer on both outer sides than the width of the print medium having the shortest width to be conveyed.

3. The thermal printer according to claim 1, wherein a diameter of the shaft in the first region is larger than diameters of the shaft in the second regions, and diameters of the shaft are formed in a stepwise manner at a boundary portion between the first region and the second regions.

4. The thermal printer according to claim 3, wherein in the second regions, the diameters of the shaft are formed in a stepwise manner in a plurality of steps such that the diameters of the shaft are reduced toward the outer sides of the platen.

5. The thermal printer according to claim 1, wherein a diameter of the shaft in the first region is larger than diameters of the shaft in the second regions, and in the second regions, the diameters of the shaft are continuously reduced toward the outer sides of the platen.

6. The printer according to claim 1, wherein the print head that is a thermal print head.

7. A receipt printer, comprising:

a platen having a rotatable columnar shape and configured to convey a receipt roll paper having various widths, with a central portion in a direction of a rotary shaft as a reference, in a manner of being in contact with an outer peripheral portion; and a thermal print head oppositely disposed along the platen, pressed by the outer peripheral portion of the platen, and that is configured to perform printing by applying heat to the receipt roll paper, wherein the platen comprises a shaft constituting the rotary shaft and a rubber including the outer peripheral portion provided on an outer periphery of the shaft, and has a first region centered on the central portion and second regions on both outer sides in the direction of the rotary shaft with respect to the first region, and a diameter of the platen in the first region and diameters of the platen in the second regions are the same, and a thickness of the rubber in the first region is smaller than a thicknesses of the rubber in the second regions, wherein the first region has a length substantially coinciding with the width of the receipt roll paper having a shortest width to be conveyed.

8. The receipt printer according to claim 7, wherein the first region is longer on both outer sides than the width of the receipt roll paper having the shortest width to be conveyed.

9. The receipt printer according to claim 7, wherein a diameter of the shaft in the first region is larger than diameters of the shaft in the second regions, and diameters of the shaft are formed in a stepwise manner at a boundary portion between the first region and the second regions.

10. The receipt printer according to claim 9, wherein in the second regions, the diameters of the shaft are formed in a stepwise manner in a plurality of steps such that the diameters of the shaft are reduced toward the outer sides of the platen.

11. The receipt printer according to claim 7, wherein a diameter of the shaft in the first region is larger than diameters of the shaft in the second regions, and in the second regions, the diameters of the shaft are continuously reduced toward the outer sides of the platen.

12. A label printer, comprising:

a platen having a rotatable columnar shape and configured to convey a roll label paper having various widths, with a central portion in a direction of a rotary shaft as a reference, in a manner of being in contact with an outer peripheral portion; and a thermal print head oppositely disposed along the platen, pressed by the outer peripheral portion of the platen, and that is configured to perform printing by applying heat to the roll label paper, wherein the platen comprises a shaft constituting the rotary shaft and a rubber including the outer peripheral portion provided on an outer periphery of the shaft, and has a first region centered on the central portion and second regions on both outer sides in the direction of the rotary shaft with respect to the first region, and a diameter of the platen in the first region and diameters of the platen in the second regions are the same, and a thickness of the rubber in the first region is smaller than a thicknesses of the rubber in the second regions, wherein the first region has a length substantially coinciding with the width of the roll label paper having a shortest width to be conveyed.

13. The label printer according to claim 4, wherein the first region is longer on both outer sides than the width of the roll label paper having the shortest width to be conveyed.

14. The label printer according to claim 12, wherein a diameter of the shaft in the first region is larger than diameters of the shaft in the second regions, and diameters of the shaft are formed in a stepwise manner at a boundary portion between the first region and the second regions.

15. The label printer according to claim 14, wherein in the second regions, the diameters of the shaft are formed in a stepwise manner in a plurality of steps such that the diameters of the shaft are reduced toward the outer sides of the platen.

16. The label printer according to claim 12, wherein a diameter of the shaft in the first region is larger than diameters of the shaft in the second regions, and in the second regions, the diameters of the shaft are continuously reduced toward the outer sides of the platen.

* * * * *